Dec. 2, 1941.    F. G. MANSON    2,264,321
LIFESAVING APPARATUS
Filed Dec. 26, 1939    2 Sheets-Sheet 1
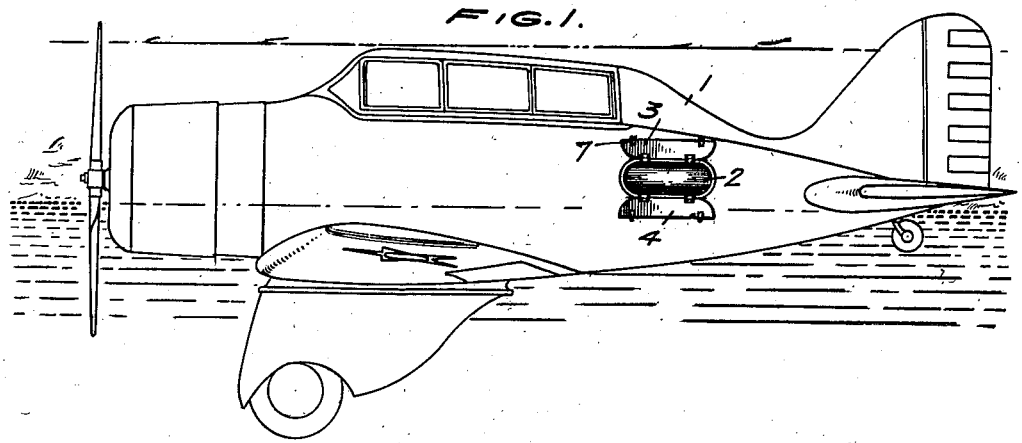
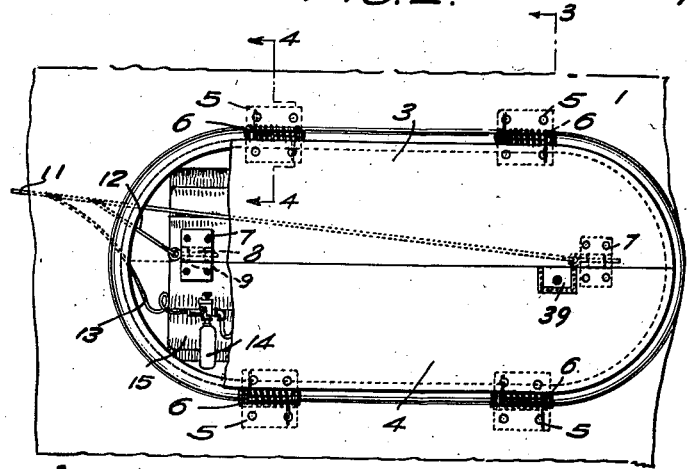
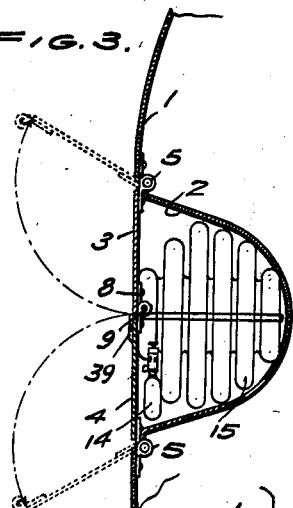
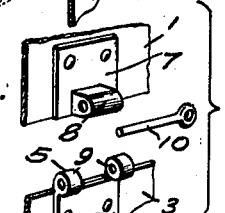
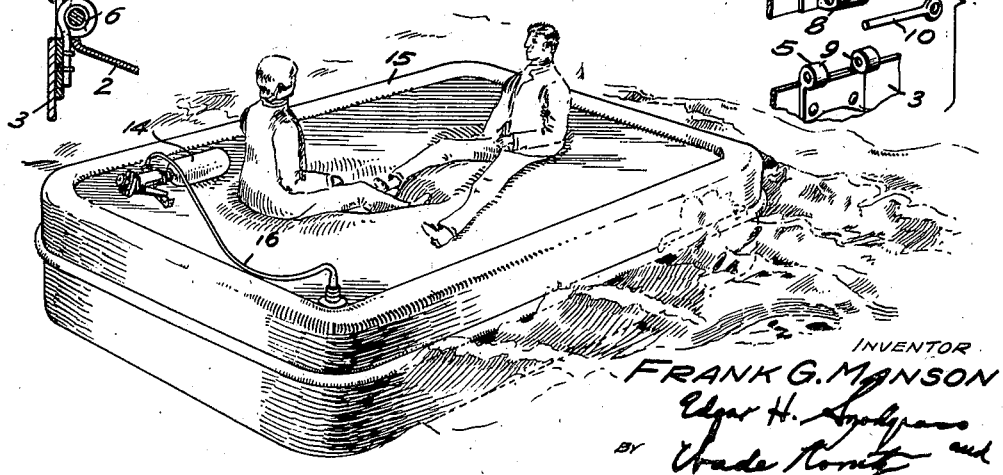
INVENTOR
FRANK G. MANSON

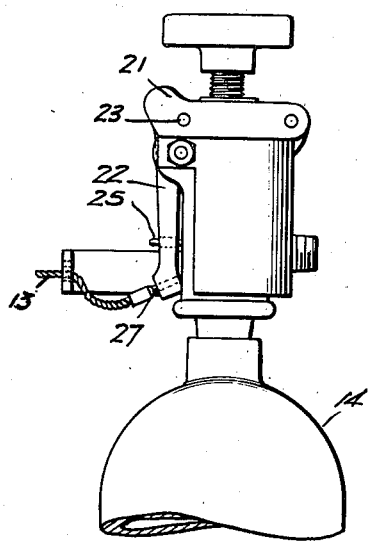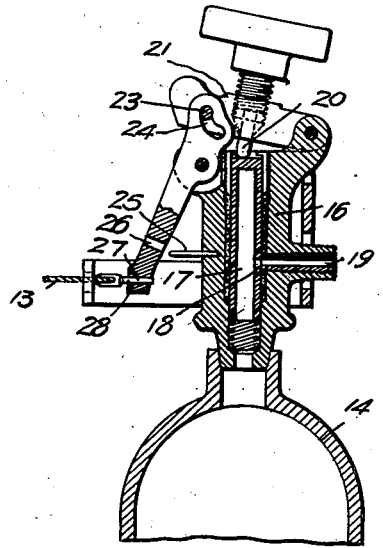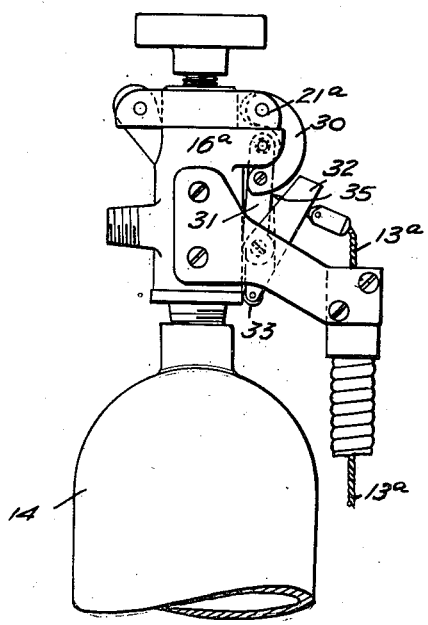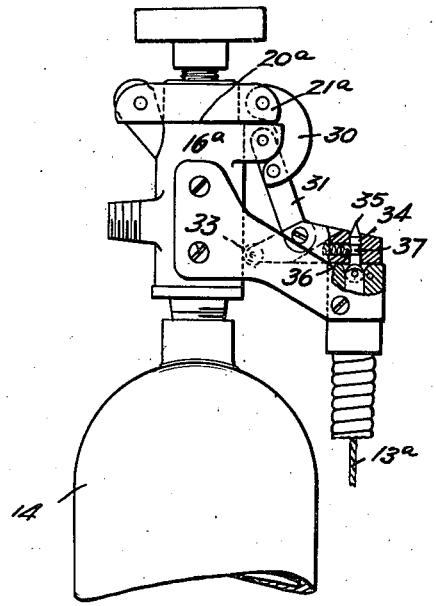

Patented Dec. 2, 1941

2,264,321

UNITED STATES PATENT OFFICE 2,264,321

LIFESAVING APPARATUS

Frank G. Manson, Dayton, Ohio

Application December 26, 1939, Serial No. 310,901

8 Claims. (Cl. 244—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a life-saving device, and particularly to an inflatable self-ejecting life raft arranged in a compartment of a vehicle such as an airplane or the like.

It is an object of this invention to arrange a compartment in an airplane in such a manner that a life raft launched therefrom will land in the water in a substantially operative position for normal attitudes of the plane.

It is a further object of this invention to provide, in an airplane, means for remotely controlling the operation of mechanism for opening the compartment closure means and for inflating the raft.

It is still another object of this invention to provide self-detaching connecting means between the remotely controlled means for inflating the raft and the raft-inflating mechanism.

In the drawings:

Fig. 1 is a side elevational view of an airplane having a compartment in the side thereof—the doors of the compartment being open;

Fig. 2 is an elevational view of the compartment with the doors closed and partly broken away to show the life raft, the inflating means, and the remote-control mechanism for operating the inflating means;

Fig. 3 is a cross-sectional view taken along the lines 3—3 of Fig. 2;

Fig. 4 is a cross-sectional view taken along the lines 4—4 of Fig. 2;

Fig. 5 is an exploded perspective view of the latch for holding the compartment doors closed;

Fig. 6 is a perspective view of the life raft in operation;

Fig. 7 is an elevational view of the upper part of the inflating-gas container and the valve-operating mechanism;

Fig. 8 is a cross-sectional view of the container shown in Fig. 7 with the mechanism in operated position;

Fig. 9 is an elevational view of the upper part of an inflating-gas container having a different valve-operating mechanism;

Fig. 10 is an elevational view similar to Fig. 9, with the releasing mechanism in operated position and with parts broken away to show the releasable connection between the pull cord and the valve-operating mechanism.

Referring to the drawings:

An airplane 1 has in the fuselage adjacent the rear thereof, a compartment 2 having closure means therefor comprising a pair of oppositely swinging doors 3 and 4 pivotally connected to the plane by hinge members 5. Coil springs 6, associated with the doors to urge them into open position, are suitably fastened at one end to the plane and at the other end to the doors. The dooors 3 and 4 are provided with latching means 7, shown in detail in Fig. 5, comprising a lug 8 on one member receivable between a pair of lugs 9 on the other member, the lugs having aligned openings therein for receiving a fastening pin 10. Attached to one of the pins 10 is a suitable cord 11, having a lead 12 attached to the other pin and a lead 13 releasably attached to the inflating-gas container 14, which in turn is carried by and operatively connected to a life raft 15 by a tube 16. A hand hole having a cover 39 is provided in door 4 adjacent each hinge 7, so that pin 10 can be inserted in the latch.

As shown in Fig. 3, the life raft 15 is foldably received in compartment 2. When it is desired to launch the raft, a pull on cord 11 removes pins 10 from the latches permitting doors 3 and 4 to open under the action of springs 6. Continued pull on cord 11 takes up the slack in cord 13 and operates the valve on container 14 to permit flow of gas from the container to the raft. Inflation of the raft will cause it to eject itself from the compartment if still therein. Cord 13 disengages itself from the gas container after operation of the valve by connections shown in Figs. 7, 8, 9 and 10.

Referring to the embodiment of the releasing means shown in Figs. 7 and 8, the container 14 has a valve member 16 attached thereto. Slidable in member 16 is a hollow plunger member 17 having an opening 18 therein alignable with outlet opening 19. Plunger 17 is held in an out-of-alignment position by a pin 20, adjustably carried by arm 21. The position of arm 21 is controlled by lever 22, connected to lever 21 by pin 23 and cam-slot 24. Lever 2 is held in valve-closing position by pin 25, received in opening 26 in the lever. Cord 13 is attached to lever 22 by a pin 27 received in slot 28, arranged at an angle to the direction of pull on cord 13 when the lever is in valve-closing position. The parts are so arranged that when the arm 22 is in valve-opening position, pin 27 and slot 28 are in the line of pull of cord 13 and the pin will be withdrawn from the slot, separating the cord from the valve-operating mechanism.

In the modification shown in Figs. 9 and 10, the valve mechanism is identical with that shown in Figs. 7 and 8 and will not be described. Valve operating pin 20a, similar to pin 20, is carried by arm 21a. Link 30 is pivotally connected at one end to arm 21a and at the other end to lever 31, which in turn is pivotally mounted on the valve body 16a. Operating arm 32, pivotally connected to lever 31, has mounted thereon at one end thereof a valve body engaging roller 33. The other end of arm 32 is provided with a recess 34 for receiving pin 35, attached to cord 13a. A spring-pressed ball 36 is adapted to be received in a recess 37 in the pin to prevent unwanted disengagement of the pin from the arm 32.

The operation of this embodiment of the invention is as follows: A pull on cord 13a rotates arm 32 about its pivotal connection with lever 31 to pull lever 31 outwardly. Raising arm 21a by means of link 30 releases the valve in the same manner as described in connection with the modification of the invention described in Figs. 7 and 8. With the parts as shown in Fig. 10, an additional pull on cord 13a will separate the cord from the valve operating mechanism.

It is obvious that various changes and modifications may be made in the device, it being intended to limit the scope of the invention only by the appended claims.

I claim:

1. In a vehicle body provided with a compartment, an inflatable life raft in said compartment, valve controlled means carried by said raft for inflating the same, means associated with said valve for operating the same including body-carried means detachably connected to said operating means, said detachable connection comprising a recess in said operating means, a pin on said body-carried means receivable in said recess, the longitudinal axis of said pin and recess being out of alignment with the direction of force from said body-carried means when said valve is closed and in alignment with said direction of force when said valve is open whereby said body-carried operating means is detached from said valve operating means after operating the same by continued force on the body-carried means.

2. In a vehicle body provided with a compartment, an inflatable life raft in said compartment, means carried by said raft for inflating the same, means carried by said body member for transmitting an operating force to said inflating means, pin and slot means releasably connecting said force transmitting means to said inflating means, said pin and slot connection being movable into alignment with the direction of the operating force upon operation of said inflating means whereby an additional force separates said pin from said slot.

3. In an aircraft having a compartment therein, an inflatable life raft in said compartment, a pair of oppositely swinging doors providing closure means for said compartment, means operatively associated with said life raft for inflating the same, fastening means for said closure means, and means operatively associated with said fastening means and said inflating means for simultaneously operating the same—said compartment being curved outwardly in all directions from a center point at the back thereof and said raft when inflated being materially larger than said compartment.

4. In a device of the class described, a body having a compartment therein; a pair of oppositely swinging doors providing releasable cover means for said compartment; an inflatable life raft in said compartment; means for inflating said raft, said raft when inflated being materially larger than said compartment; and means for simultaneously releasing said cover means and operating said inflating means—said compartment being curved laterally outwardly in all directions from a center point at the back thereof to aid in launching the said raft.

5. In a life saving apparatus of the type which includes a vehicle body provided with a compartment, an inflatable life raft in said compartment, means including a valve and a valve operating means carried by said raft and operatively connected thereto for inflating the same, and force-transmitting means carried by said vehicle body for remote operation of said valve operating means; a detachable connection between said valve operating means and said inflating means including pin and slot connecting means carried by and movable with said valve operating means from an out-of-alignment position into a position in alignment with the direction of the operating force, whereby a continued force—after operation of said valve operating means—serves to disconnect said pin from said slot.

6. A device as recited in claim 5, in which said valve operating means comprises a pivotally-mounted valve engaging lever means operatively associated with said valve and to which said force-transmitting means is connected.

7. A device as recited in claim 5, in which said pin and slot connection comprises a spring-pressed ball and recessed connection between said pin and slot carrying member.

8. A device as recited in claim 5 in which said valve-operating means comprises a valve-engaging member pivotally mounted on said inflatable means, a lever pivotally mounted on said inflatable means, a link operatively connecting said member to said lever, and a cam lever connected to said second-mentioned lever and to which said force-transmitting means is connected.

FRANK G. MANSON.